UNITED STATES PATENT OFFICE.

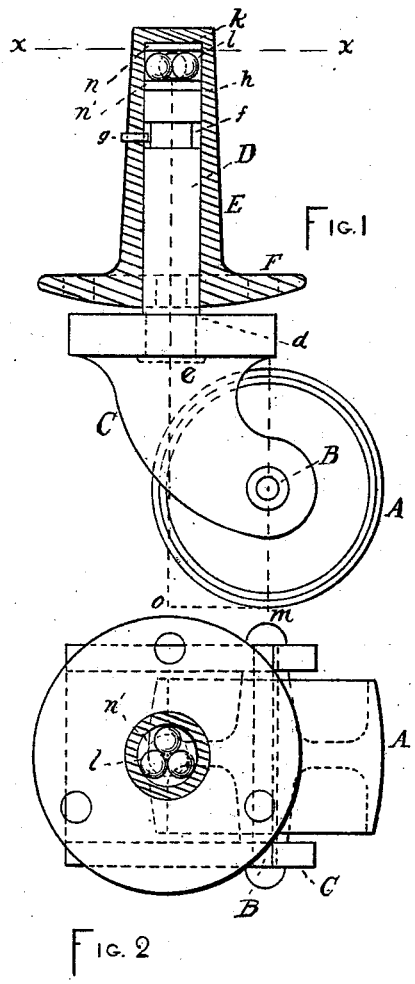

ARTHUR A. ALLEN, OF NEW YORK, N. Y.

CASTER.

SPECIFICATION forming part of Letters Patent No. 536,366, dated March 26, 1895.

Application filed February 14, 1894. Serial No. 500,104. (No model.)

*To all whom it may concern:*

Be it known that I, ARTHUR A. ALLEN, of the city, county, and State of New York, have invented a new and useful Improvement in Casters; and I do hereby declare that the following is a full, clear, and exact description of the same, reference being had to the accompanying drawings, forming part of this specification.

My invention relates to that kind of casters which employ balls for reducing friction, thus more or less converting rubbing friction into rolling friction.

Hitherto, balls for this purpose having been placed in a disadvantageous position with reference to the leverage between the bearing point of the wheel and the vertical axis of the spindle, the entrainment, when moving heavy bodies, such as pianos, &c., has not been so prompt and easy as desirable, the anti-friction balls being radially too far from the vertical axis of the spindle. In some cases the position of the balls has been almost coincident with a circle having the same axis as that of the spindle and a radius equal to the distance from the vertical axis of the spindle to the center of the roller axle, and thus very little purchase to overcome their frictional resistance was attained.

My invention consists in such a construction as permits the anti-friction balls to be assembled symmetrically around, and as near to the vertical axis of the spindle as the diameter of the balls will permit, thus obtaining a much greater purchase between the bearing point of the wheel and the bearing points of the balls than has hitherto been obtained; and while thus greatly increasing the promptness and ease of entrainment, enabling casters so made to be manufactured at only a trifling cost, if any, in excess of that required to manufacture common kinds having neither anti-friction balls nor anti-friction rollers.

Figure 1 is partly a side view and partly a vertical section of a caster constructed in accordance with my improvement, the section being made through the spindle socket. Fig. 2 is a horizontal cross-section made on the line $xx$ in Fig. 1.

The construction of the wheel A, its axis B and the casting C are the same as in ordinary casters, but the spindle D is shouldered at $d$, and being passed through a hole in the casting C, is riveted fast to this casting as shown at $e$. The spindle D, however, if preferred, may be cast integrally with the casting or saddle C.

At some convenient point in the spindle an annular groove $f$ may be formed to receive the inner end of a holding pin $g$. The construction so far as now described, does not differ essentially from that of ordinary casters in general use.

Instead of making the upper end of the spindle cone-pointed as is commonly done, in my improved construction I make this end with a plane $h$, at a right angle with the vertical axis of the spindle. I also make the inner face of the upper end of the socket a plane $k$ parallel to the plane of the upper end of the spindle; and between these two planes I place the balls $l$, using three of them of such uniform diameter that when placed in the space between the planes $h$ and $k$ and in use, they bear equally and vertically between said planes and are arranged tangentially each with the other two. I also sometimes either place hard steel plates $n\ n'$ in the space between the planes $h$ and $k$, one above and the other below the balls $l$ to receive wear; or, as an equivalent for these plates I case-harden the plane surfaces $k$ and $h$. The spindle-socket E is formed with the usual flange F for its attachment to the article for which it is designed.

It will be evident that the purchase between the point $m$ and a point $o$ situated in the axial line of the spindle will be considerably greater than when balls are used exteriorly to the spindle-socket E, or than when they are arranged around the spindle or any extension of the spindle, and are not tangent each to the other two. It will be also evident that the similarity of the surfaces $h$ and $k$ is, in my improvement a vital feature of the construction of these parts and it is not essential, though I have preferred to so illustrate and describe my improvement, that they should be flat. Said surfaces may be one of them convex and the other concave, or both may be concave to any extent provided that they are similar and can be separated by a uniform distance between the points where the balls are tangent to them.

Casters made in this manner are no more cumbrous than those of the simpler kinds; and in use I have found that heavy pianos provided with them are moved more easily than with any other caster known to me that does not necessitate a greater number of antifriction balls.

Having thus described my improvement, what I claim as my invention, and desire to secure by Letters Patent, is expressed in the following:

1. The combination with the socket and the spindle of a caster, the inner surface of the crown of the socket and the surface of the upper extremity of the spindle being parallel with each other from the center to the circumference, of three balls each of which is tangent to the other two interposed between the said surfaces, substantially as herein set forth.

2. The combination with the socket and the spindle, of the three antifriction balls $l$ and the two plates $n$, each of the said balls being tangent to the other two between the plates $n$ and the said balls and plates being interposed between the crown of the socket and the upper extremity of the spindle, substantially as herein set forth.

Signed at Brooklyn, in the county of Kings and State of New York, this 12th day of February, A. D. 1894.

ARTHUR A. ALLEN.

Witnesses:
 LEICESTER ALLEN,
 SUSAN M. ALLEN.